United States Patent [19]
Yamada et al.

[11] Patent Number: 5,998,960
[45] Date of Patent: Dec. 7, 1999

[54] POWER SUPPLY SYSTEM FOR ELECTRIC VEHICLE

[75] Inventors: Jun Yamada, Tokyo; Shigenori Kinoshita, Kanagawa, both of Japan

[73] Assignees: Fuji Electric Co., Ltd., Kanagawa; Nissan Diesel Motor Co., Ltd., Saitama, both of Japan

[21] Appl. No.: 09/047,495

[22] Filed: Mar. 25, 1998

[30] Foreign Application Priority Data

Mar. 25, 1997 [JP] Japan .................................. 9-070985

[51] Int. Cl.⁶ ....................................................... H02J 7/00
[52] U.S. Cl. ............................................ 320/104; 320/103
[58] Field of Search ................................... 320/104, 101, 320/166, 134, 103

[56] References Cited

U.S. PATENT DOCUMENTS

| | | | |
|---|---|---|---|
| 3,987,352 | 10/1976 | Hirota | 320/101 |
| 4,056,764 | 11/1977 | Endo et al. | 320/101 |
| 4,380,795 | 4/1983 | Lee et al. | 363/131 |
| 5,532,572 | 7/1996 | Okamura | 320/166 |
| 5,659,240 | 8/1997 | King | 320/134 |

*Primary Examiner*—Peter S. Wong
*Assistant Examiner*—Lawrence Luk
*Attorney, Agent, or Firm*—Finnegan, Henderson, Farabow, Garret & Dunner, L.L.P.

[57] ABSTRACT

An electric vehicle whose wheels are powered by a d.c. power supply includes a combination of a rechargeable high-energy battery and a rechargeable high-power battery or to a hybrid electric vehicle whose wheels are powered by the d.c. power supply and an internal combustion engine. The d.c. power supply is formed by connecting a d.c. circuit which comprises a rechargeable high-power battery and a current-stiff two-quadrant chopper in parallel with the rechargeable high-power battery. When an current of the rechargeable high-power battery is increased to a value which is greater than a specified value, the chopper is activated to charge or discharge the rechargeable high-power battery, thereby reducing an current of the rechargeable high-power battery to a value which is smaller than the specified value.

9 Claims, 4 Drawing Sheets

POWER SUPPLY SYSTEM FOR ELECTRIC VEHICLE

BACKGROUND OF THE INVENTION

1. Field of the Invention

The present invention relates to an electric vehicle whose wheels are powered by a d.c. power supply comprising a combination of a high-energy rechargeable battery and a rechargeable high-power battery (an electric vehicle such as that powered solely by batteries will be hereinafter simply referred to as an "electric vehicle," as needed), and to a power supply system for a hybrid electric vehicle powered by a combination of a d.c. power supply and an internal combustion engine.

2. Description of the Related Art

FIG. 5 is a view showing a power train of a publicly-known series-type hybrid electric vehicle. In the drawing, reference numeral 1 designates an engine; 2 designates a generator (both the engine and the generator may also be collectively referred to as an "engine generator"); 3 designates a rectifier; 4 designates a main battery; 5 designates an inverter; 6 designates a vehicle drive motor; 7 designates a reduction gear; 8 designates a differential gear; 91 designates a right wheel; 92 designates a left wheel; 10 designates an auxiliary battery; 11 designates a DC-DC converter for recharging the auxiliary battery 10; 12 designates an auxiliary power supply for use with accessories; and 13 designates collectively-grouped accessories such as an air-conditioner.

In terms of efficiency of power generation and a cutback in exhaust gas of an engine, an engine generator is usually operated at an optimum engine speed under optimum load. Specifically, the engine generator is operated in a specified drive condition without reference to a vehicle speed, thereby recharging the main battery 4 via the rectifier 3.

An effort has been made to achieve a further improvement in efficiency and a further reduction in pollution by deactivating the generator 2 when the main battery 4 is recharged to or greater than a specified amount.

In this system, the power of the engine 1 is reduced to a power level smaller than the maximum power generally required to accelerate the vehicle, and the power required to accelerate the vehicle is supplied from the main battery 4. When the power of the engine 1 is greater than a vehicle driving force in constant driving, the main battery 4 becomes recharged by means an excess of power of the engine by way of the generator 2 and the rectifier 3.

When the vehicle is under braking, part of kinetic energy of the vehicle is stored in the main battery 4 through regeneration via the motor 6 and the inverter 5. Simultaneously, the rectifier 3 is operated in inverter mode, and the generator 2 is operated in motor mode. As a result, an engine brake is applied to the vehicle as in the case of an engine-driven vehicle. If there is a deficiency of electric braking force, the vehicle is mechanically braked as in the case of an unillustrated engine-driven vehicle.

Further, when the engine 1 is shut down, the generator 2 does not generate any power. In such a state, the vehicle driving force and the power used for accessories are supplied from the main battery 4.

The power train of the electric vehicle is the same as that shown in FIG. 5, except that the vehicle is not provided with the engine 1, the generator 2, and the rectifier 3. All the power required by the vehicle is supplied from the main battery 4. The main battery 4 is recharged by an unillustrated external power supply.

This electric vehicle does not produce any exhaust gas which would be otherwise produced as a result of operation of an engine, and hence corresponds to a zero-emission vehicle.

As mentioned previously, the publicly-known series-type hybrid electric vehicle is powered by the engine generator in constant driving, and a deficiency of the power required to accelerate the vehicle is remedied by the supply from the main battery 4. In a case where running power required when the engine is in an inactive state or power required by accessories is greater than the power generated by the engine generator, or where the required running power is greater than the power generated by the engine generator even in constant driving, a deficiency of power must be remedied by the power supplied from the main battery 4. For these reasons, the main battery 4 must be formed from a battery which produces high power, i.e., a high-power (or high power density) battery.

The presently dominant main battery for use with a publicly-known electric vehicle is a chemical battery which utilizes a chemical reaction, such as a lead battery, a nickel-hydrogen battery, or a lithium-ion battery. As a matter of course, the main battery is in principle the same as the main battery for use with a hybrid electric vehicle and, hence, is of high power type. There is a desire for a battery which produces greater power.

Next, regenerative braking featuring the hybrid electric vehicle or ordinary electric vehicle will be described. As mentioned previously, when the vehicle is under braking, the kinetic energy of the vehicle is stored in the main battery 4 through regeneration by way of the motor 6 and the inverter 5. The principle characteristic of the electric vehicle of this type is that part of the energy accumulated in the vehicle at the time of an accelerating operation can be regenerated when the vehicle is braked.

The same amount of power is usually generated by braking in a shorter period of time than by acceleration. This means that braking power is greater than accelerating power. Further, the chemical battery usually suffers greater losses at the time of recharge than at the time of discharge.

For these reasons, it is impossible for the hybrid electric vehicle or ordinary electric vehicle to regenerate all the power produced by braking. As things stand, the majority portion of energy produced by braking is converted into heat through mechanical braking.

This means that the bulk of generated power is discarded in the form of heat. Improving the efficiency of utilization of energy by regenerating as much power as possible at the time of a braking operation presents a significant problem.

SUMMARY OF THE INVENTION

The present invention has been made to solve the foregoing problem with the related art, and therefore an object of the present invention is to provide a power supply system for an electric vehicle which is capable of improving the efficiency of utilization of energy by regenerating as much power as possible at the time of a braking operation, to accomplish an improvement in fuel consumption of a hybrid electric vehicle and a reduction in an exhaust gas, and to realize a light-weight, compact, and less-expensive battery by reduction in the amount of rechargeable high-power battery used in the vehicle.

The present invention has been contrived in consideration of the fact that a capacitor, which is not a chemical battery but a certain type of physical battery, is capable of withstanding fast charge or discharge or producing large power, as well as of operating in a range from substantially zero voltage to the maximum voltage.

In principle, the present invention provides a power supply system in which a current-stiff two-quadrant chopper is connected in series with a capacitor used as a rechargeable high-power battery, thereby constituting a high-power d.c. power supply which produces a substantially constant output voltage. A main battery formed from a rechargeable high-power battery is connected in parallel with the d.c. power supply, thereby constituting a d.c. power supply for use in a hybrid electric vehicle or electric vehicle.

More specifically, the invention provides an electric vehicle whose wheels are powered by a d.c. power supply comprising a combination of a high-energy rechargeable battery and a rechargeable high-power battery, the vehicle comprising:

a d.c. power supply circuit which is formed from a series-circuit of the rechargeable high-power battery and a current-stiff two-quadrant chopper and which is connected in parallel with the rechargeable high-power battery used as the main battery to thereby constitute a d.c. power supply, wherein When the electric current of the rechargeable high-power battery is increased to a value greater than a specified value, the chopper is actuated to charge or discharge the rechargeable high-power battery in such a way that the current of the high-energy battery decreases to the specified value or less.

Also, the invention provides a hybrid electric vehicle whose wheels are powered by an internal combustion engine and a d.c. power supply comprising a combination of a high-energy rechargeable battery and a rechargeable high-power battery, the vehicle comprising:

a d.c. power supply circuit which is formed from a series-circuit of the rechargeable high-power battery and a current-stiff two-quadrant chopper and which is connected in parallel with the rechargeable high-power battery used as the main battery to thereby constitute a d.c. power supply, wherein when the current of the rechargeable high-power battery is increased to a value greater than a specified value, the chopper is actuated to charge or discharge the rechargeable high-power battery in such a way that the current of the high-energy rechargeable battery decreases to the specified value or less.

In the invention, it would be better to enable the high-energy rechargeable battery and the rechargeable high-power battery to be recharged by an engine generator.

In the invention, an electric double-layer capacitor can be used for the high-output battery.

In the invention, it is desirable to use a chemical battery for the rechargeable high-power battery. In such a case, a fuel cell may be used as the chemical battery.

DETAILED DESCRIPTION OF THE PREFERRED EMBODIMENTS

Now, a description will be given in more detail of preferred embodiments of the present invention with reference to the accompanying drawings.

Figure 1:
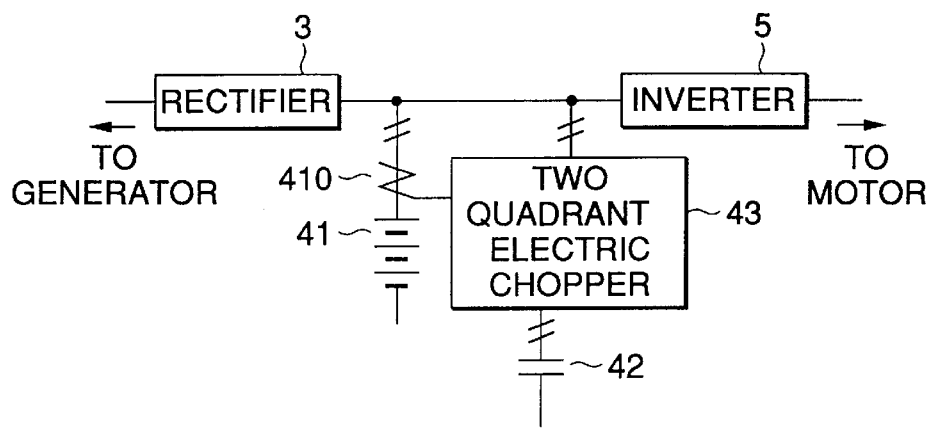
FIG. 1 is a schematic diagram showing the principle elements of power supply system according to an embodiment of the present invention.
Figure 5:
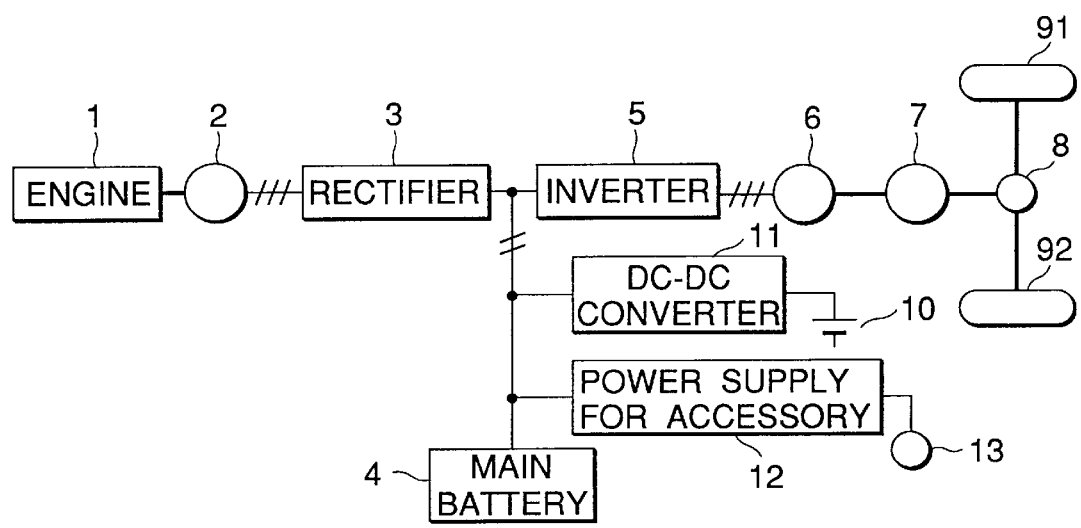
FIG. 5 is a schematic diagram showing a power train of a publicly-known series-type hybrid electric vehicle.

An embodiment of the present invention will be described by reference to the accompanying drawings. FIG. 1 is a schematic diagram showing the principle elements of a power supply system according to the embodiment. The same reference numerals are assigned to the elements which are the same as those shown in FIG. 5.

In the drawing, reference numeral 41 designates a main battery used as a rechargeable high-power battery, and the main battery comprises a chemical battery utilizing a chemical reaction, such as a lead battery, a nickel-hydrogen battery, or a lithium-ion battery, or a fuel cell which is one type of chemical battery (and includes a rechargeable fuel cell). The positive electrode of the main battery 41 is connected to a node between the rectifier 3 and the inverter 5.

Reference numeral 42 designates a capacitor used as a rechargeable high-power battery, and the capacitor corresponds to an electric double-layer electric capacitor comprising a conductive macromolecule. The capacitor 42 is connected in series with a current-stiff two-quadrant chopper 43. In short, the d.c. circuit, comprising the capacitor 42 and the chopper 43, is connected in parallel with the main battery 41.

Figure 2:
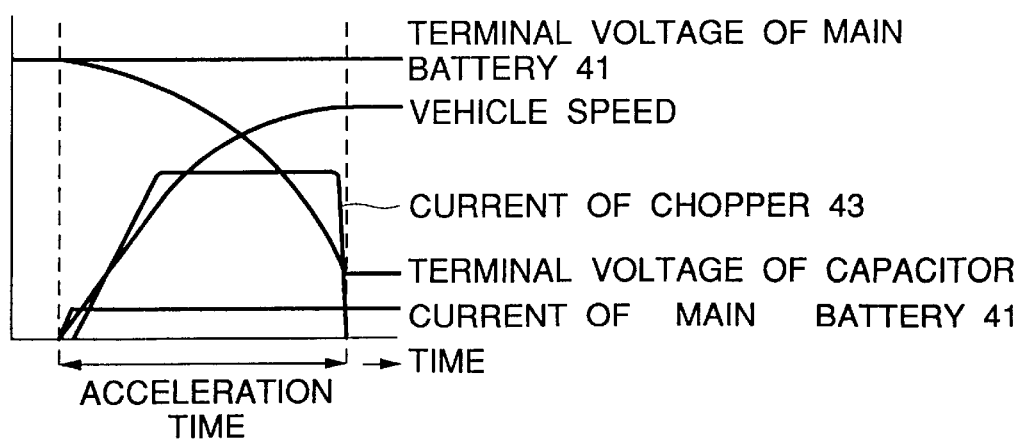
FIG. 2 is a graph showing voltages and currents in primary features of the system according to the present embodiment when a vehicle is accelerated.

Reference numeral 410 designates a current detector for detecting a current of the main battery 41, and an output from the current detector 410 is applied to a control circuit of the chopper 43 (the chopper 43 shown in FIG. 2 includes the control circuit).

The polarity of a voltage across the input and output terminals of the chopper 43 remains unchanged without reference to operation mode, whereas the polarity of a current appearing in the input and output terminals of the same changes depending on operation mode. For these reasons, the chopper is referred to as a "double-quadrant chopper".

When the vehicle drives off, the capacitor 42 is recharged beforehand to a voltage which is substantially the same as that of the main battery 41 by means of the operation of the chopper 43. The vehicle is accelerated by means of the power stored in the capacitor 42. In short, acceleration energy is taken out of the capacitor 42.

FIG. 2 is a graph showing currents and voltages in the primary features of the power supply system obtained when a vehicle is accelerated. The power required to accelerate the vehicle is supplied through discharges of the capacitor 42 and the main battery 41. The majority portion of acceleration power is supplied from the capacitor 42 under control of the chopper 43.

The voltage of the capacitor 42 is decreased with lapse of acceleration time gradually to a value which is smaller than the terminal voltage of the main battery 41. In such a case, the chopper 43 is activated such that it acts like a booster chopper relative to the capacitor 42. The chopper 43 is controlled such that the voltage of the terminal of the chopper 43 connected to the main battery becomes equal to the terminal voltage of the main battery 41.

Figure 3:
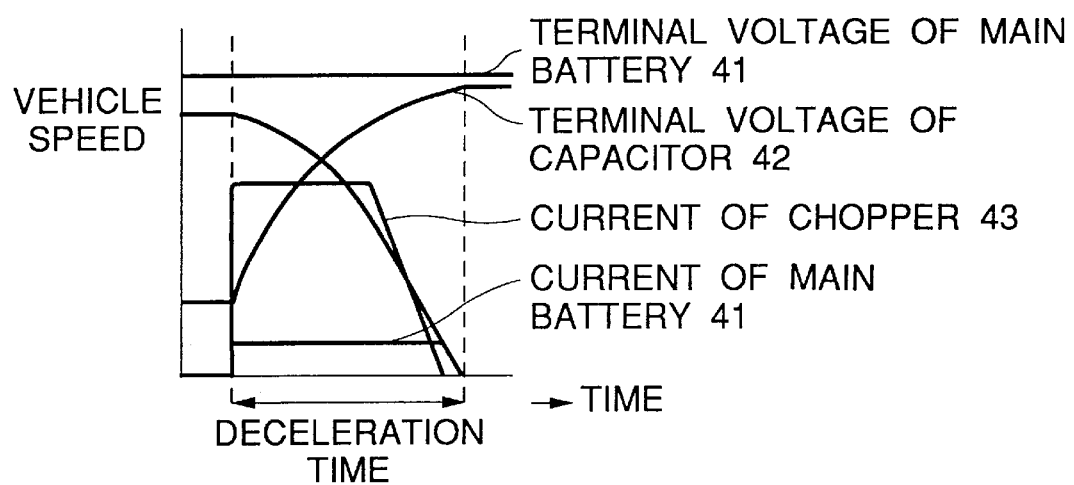
FIG. 3 is a graph showing voltages and currents in primary features of he system according to the present embodiment when the vehicle is decelerated.

FIG. 3 shows currents and voltages in the primary features of the power supply system obtained when the vehicle is decelerated. The kinetic energy developing in the vehicle at the time of deceleration is converted into electric power by way of the motor 6 and the inverter 5, and the thus-converted power is stored in the main battery 41, as well as in the capacitor 42 by way of the chopper 43. The majority portion of the power regenerated at the time of a braking operation is stored in the capacitor 42 under control of the chopper 43 as in the case of acceleration.

The voltage of the capacitor 42 is increased with lapse of deceleration time. Since the voltage of the capacitor 42 is lower than the terminal voltage of the main battery 41, the chopper 43 operates, as a step-down chopper relative to the main battery 41, so as to constantly maintain the voltage of the main battery 41. The current shown in FIG. 3 is reversed in polarity in comparison with the current shown in FIG. 2.

Next, chopper control by the chopper 43 will be described by reference to FIG. 4.

Figure 4:
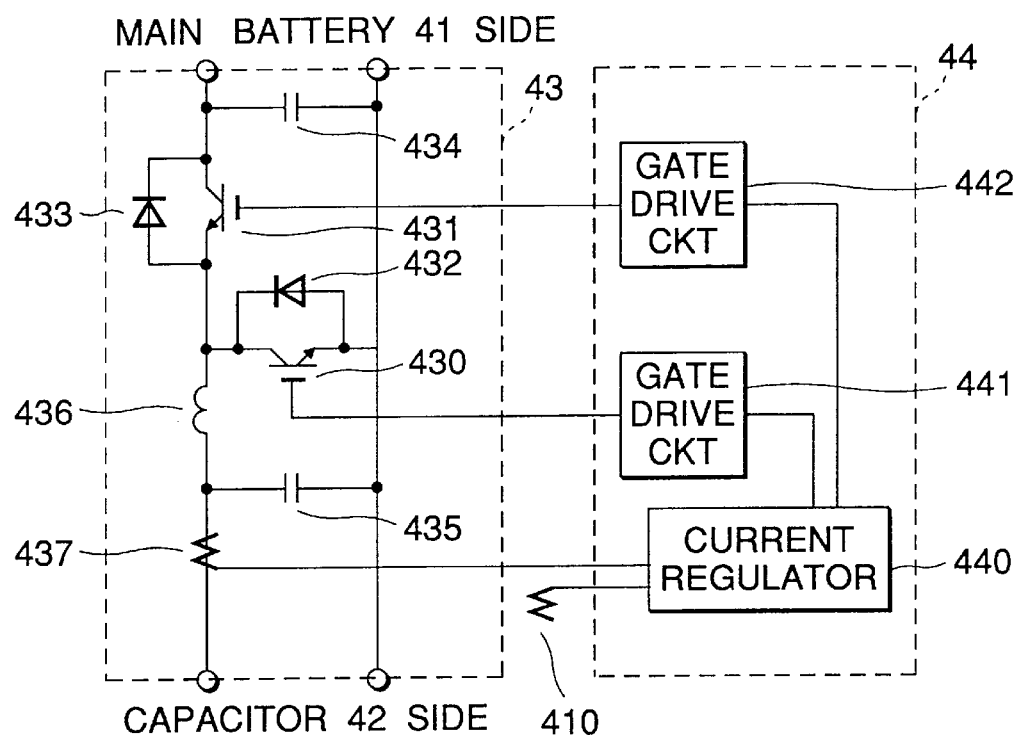
FIG. 4 is a schematic diagram showing the configuration of a chopper and it's control circuit according to the present embodiment.

In FIG. 4, the chopper 43 comprises semiconductor switches (transistors are commonly used for switches of this type) 430, 431, diodes 432, 433 reversely connected in parallel with the switches, smoothing capacitors 434, 435 connected between the terminal of the chopper 43 connected to the main battery 41 and the terminal of the chopper 43 connected to the capacitor 42, and a current smoothing reactor 436.

The chopper control circuit 44 comprises a current regulator 440 which receives an output from a current detector 437 provided in the chopper 43 and an output from a current detector 410 provided in the main battery 41; and gate drive circuits 441, 442 which output gate drive signals to the semiconductor switches 430, 431 on the basis of the outputs thus received by the current regulator.

First, the operation of the power supply system when the vehicle is accelerated will be described. Prior to acceleration of the vehicle, the capacitor 42 is recharged to a voltage value which is substantially the same as that of the main battery 41. Since the chopper 43 is in an inoperative state immediately after acceleration of the vehicle, there is no discharge from the capacitor 42. Accordingly, the current is supplied to the inverter 5 from the main battery 41.

The current detector 410 detects the current output from the main battery 41 and activates the chopper 43 when the amount of output current reaches a specified amount. As a result, the current is discharged from the capacitor 42, and the discharge of the capacitor 42 is controlled such that the amount of current output from the main battery 4 is decreased to a value which is smaller than the specified value. The specified value relating to the discharge current from the main battery 41 is determined by the allowable discharge current or charge/discharge life cycle of the main battery 41. The specified value is usually smaller than the current required to accelerate the vehicle.

When the current required by the inverter 5 is increased to a value which is larger than the specified value relating to the current of the main battery 41, all the currents exceeding the specified value are supplied from the capacitor 42. As a result, the discharge current from the main battery 41 is maintained at a value which is smaller than the specified value. Concurrently, the voltage of the capacitor 42 is decreased as a result of discharge of the capacitor 42.

The chopper control by the chopper 43 will be described. The current regulator 440 shown in FIG. 4 controls the proportion of turn-on operations of the semiconductor switches 430, 431 in such a way that the current of the main battery 41 approaches the specified value. Depending on whether operation mode is acceleration or deceleration mode, a decision can be made as to which of the semiconductor switches 430, 431 is operated. The decision can be made by inputting an unillustrated operation mode signal to the current regulator 440.

Next, an explanation will be given of the operation of the chopper when the vehicle is accelerated or decelerated. At the time of acceleration of the vehicle, while the semiconductor switch 431 is held in an OFF state, the semiconductor switch 430 is switched. Since the switching operation of the semiconductor switch 430 is the same as operation of an ordinary booster chopper, it's detailed description will be omitted here for brevity. Since the current of the capacitor 42 increases with an increase in the proportion of turn-on operations of the semiconductor switch 430, the current of the main battery 41 is maintained at a value which is smaller than the specified value, by changing the proportion of turn-on operations so as to correspond to the voltage of the capacitor 42.

At the time of deceleration of the vehicle, while the semiconductor switch 430 is held in an OFF state, the semiconductor switch 431 is switched. Since the switching operations of the semiconductor switch 431 are the same as the chopping operations of an ordinary step-down chopper, and hence their detailed descriptions will be omitted here for brevity. Since the current of the capacitor 42 increases with an increase in the proportion of turn-on operations of the semiconductor switch 430, the current of the main battery 41 is maintained at a value which is smaller than the specified value, by changing the proportion of turn-on operations so as to correspond to the voltage of the capacitor 42.

As mentioned previously, the present invention is directed to a power supply system in which a physical battery which is used as a rechargeable high-power battery having fast charge/recharge function or a large power density, such as a capacitor, is connected in series with a current-stiff two-quadrant chopper. Further, a main battery; that is, a rechargeable high-power battery, which does not have the fast charge/recharge function but has a large energy density, such as a chemical battery, is connected in parallel with the foregoing rechargeable high-power battery, thereby constituting a d.c. power supply for use in a hybrid electric vehicle or ordinary electric vehicle.

At the time of acceleration or deceleration of the vehicle at which greater power is required, power is primarily supplied from the rechargeable high-power battery. In contrast, at the time of braking the vehicle, the rechargeable high-power battery recovers the majority portion of the energy developing in the vehicle at the time of a braking operation. Further, the terminal voltage of the rechargeable high-power battery is changed from the maximum value to substantially zero through chopper controlling operations.

The present invention yields the following advantages of:

(1) being able to significantly improve the efficiency of utilization of energy of either an electric vehicle or a hybrid electric vehicle by increasing the power regenerated at the time of a braking operation;

(2) being able to considerably decrease an exhaust gas by significantly improving fuel consumption of the hybrid electric vehicle;

(3) being able to achieve a cutback in the weight, size, and cost of the battery or vehicle, because the amount of main battery used as the rechargeable high-power battery can be significantly reduced;

(4) being able to significantly reduce the cost of the power supply system; and (5) being able to provide an electric vehicle or hybrid electric vehicle having a high degree of practical utility.

What is claimed is:

1. A power supply system for use in an electric vehicle whose wheels are powered by a d.c. power supply comprising a combination of a high-energy rechargeable battery and a rechargeable high-power battery, the system comprising:

a d.c. power supply circuit which is formed from a series-circuit comprised of the rechargeable high-power battery and a two-quadrant electric chopper which is connected in parallel with the rechargeable high-energy battery used as the main battery to constitute a d.c. power supply, wherein when the current of the high-energy rechargeable battery is increased to a value greater than a specified value, the chopper is actuated to charge or discharge the rechargeable high-power battery in such a way that the current of the high-energy rechargeable battery decreases to the specified value or less.

2. A power supply system for use in a hybrid electric vehicle whose wheels are powered by an internal combustion engine and a d.c. power supply comprising a combination of a high-energy rechargeable battery and a rechargeable high-power battery, the system comprising:

a d.c. power supply circuit which is formed from the rechargeable high-power battery and a current-stiff two-quadrant chopper and which is connected in parallel with the high-energy rechargeable battery used as the main battery to thereby constitute a d.c. power supply, wherein when the current of the high-energy rechargeable battery is increased to a value greater than a specified value, the chopper is actuated to charge or discharge the rechargeable high-power battery in such a way that the current of the high-energy rechargeable battery decreases to the specified value or less.

3. The power supply system as defined in claim 2, wherein the high-energy rechargeable battery and the rechargeable high-power battery can be recharged by an engine generator.

4. The power supply system as defined in any one of claims 1, 2 or 3, wherein the rechargeable high-power battery corresponds to an electric double-layer capacitor.

5. The power supply system as defined in any one of claims 1, 2 or 3, wherein the high-energy rechargeable battery corresponds to a chemical battery.

6. The power supply system as defined in claim 5, wherein the high-energy rechargeable battery corresponds to a fuel cell.

7. A d.c. power supply system of use in an electric vehicle, comprising:

a rechargeable high-power battery (HPB) connected in series with a two quadrant chopper, thereby forming a series circuit, said series circuit connected in parallel with a high-energy battery (HEB), thereby forming a d.c. power supply, a regenerative braking system that generates electric energy as a result of a braking system of a vehicle being used to decelerate said vehicle, said chopper circuit for enabling charging of said HPB with said electric energy.

8. The system of claim 7 wherein said chopper circuit enables discharging of said HPB when the output current of the HEB reaches a predetermined amount.

9. The system of claim 8 wherein said chopper circuit is used to decrease the current of the HEB to a specified value or less than said specified value when the current of the HEB exceeds said specified value.

* * * * *